United States Patent
Zheng

(10) Patent No.: US 11,288,773 B1
(45) Date of Patent: Mar. 29, 2022

(54) MULTI-RESOLUTION IMAGE OR VIDEO

(71) Applicant: Alarm.com Incorporated, Tysons, VA (US)

(72) Inventor: Yang Yang Zheng, Vienna, VA (US)

(73) Assignee: Alarm.com Incorporated, Tysons, VA (US)

( * ) Notice: Subject to any disclaimer, the term of this patent is extended or adjusted under 35 U.S.C. 154(b) by 44 days.

(21) Appl. No.: 16/847,148

(22) Filed: Apr. 13, 2020

Related U.S. Application Data

(60) Provisional application No. 62/837,326, filed on Apr. 23, 2019.

(51) Int. Cl.
*G06T 3/40* (2006.01)
*G06T 5/00* (2006.01)
*G06K 9/20* (2006.01)

(52) U.S. Cl.
CPC .......... *G06T 3/4092* (2013.01); *G06K 9/2054* (2013.01)

(58) Field of Classification Search
CPC ............................... G06T 3/4092; G06T 5/00
See application file for complete search history.

(56) References Cited

U.S. PATENT DOCUMENTS

| | | | | |
|---|---|---|---|---|
| 6,147,709 A | * | 11/2000 | Martin | G06T 3/0062 348/239 |
| 8,238,683 B2 | | 8/2012 | Ishiga | |
| 8,681,859 B2 | | 3/2014 | Washington | |
| 9,992,502 B2 | | 6/2018 | Abbas et al. | |
| 2001/0024529 A1 | * | 9/2001 | Chao | H04N 19/63 382/240 |
| 2012/0293613 A1 | * | 11/2012 | Powers | H04N 5/23238 348/36 |
| 2012/0302212 A1 | * | 11/2012 | Ross | H04W 12/068 455/411 |
| 2013/0148741 A1 | * | 6/2013 | Steinberg | H04N 19/40 375/240.25 |
| 2013/0314429 A1 | * | 11/2013 | Croxford | G09G 5/393 345/531 |
| 2015/0117535 A1 | * | 4/2015 | Li | H04N 19/59 375/240.16 |
| 2015/0138191 A1 | * | 5/2015 | Gandolph | G06T 7/194 345/419 |
| 2017/0099449 A1 | * | 4/2017 | Kang | H04N 5/36961 |
| 2017/0244962 A1 | * | 8/2017 | Roskowski | H04N 19/91 |
| 2018/0027259 A1 | * | 1/2018 | Bravo Perez | H04N 19/132 375/240.02 |
| 2018/0262711 A1 | * | 9/2018 | Woody | H04N 21/234 |

\* cited by examiner

*Primary Examiner* — Yi Yang

(74) *Attorney, Agent, or Firm* — Fish & Richardson P.C.

(57) ABSTRACT

Methods, systems, and apparatus, including computer programs encoded on a computer storage medium, for a multi-resolution image. The methods, systems, and apparatus include actions of obtaining an image, sectioning the image into unscaled sections and sections to downscale, generating downscaled sections from the sections to downscale, providing the unscaled sections and the downscaled sections to a server.

22 Claims, 3 Drawing Sheets

MULTI-RESOLUTION IMAGE OR VIDEO

CROSS-REFERENCE TO RELATED APPLICATIONS

This application claims the benefit of U.S. Provisional Application No. 62/837,326, filed Apr. 23, 2019, which is incorporated by reference in its entirety.

TECHNICAL FIELD

This disclosure application relates generally to monitoring systems, and more particularly, to video surveillance.

SUMMARY

Techniques are described for a multi-resolution image or video. Multi-resolution may refer to that the image or video has one or more sections encoded at a first resolution and one or more sections encoded at a second, different resolution. New video cameras with more resolution come out every day. One issue caused by more resolution is that the images and video clips that the cameras may upload to servers can be very large in file size.

Having large files uploaded to servers can be troublesome. If large files are transferred over broadband, the users might experience slower response time with these large files, especially when sent wirelessly, e.g., WiFi. Also, many broadband plans have a cap on the monthly data limit and uploading large files frequently will eat into the limit. If the users are using cellular connections for the video cameras, then it may be even more important that the files being uploaded are small since cellular connections usually have lower bandwidth and data limits.

To reduce file size, cameras may be set to use lower resolution. However, setting cameras to lower resolution wastes high resolution recording potential of the cameras. An alternative that reduces file size may be based on a concept that users may care more about certain areas in an image or video than other areas. For example, if a user has a video camera set up in the front of the house, the user probably cares more about the area in front of the house, e.g., the door in particular, over the areas showing neighbors' houses.

Accordingly, a system may keep high resolution in the areas of the image that the user has more interest in while lowering the resolution in areas of the image that the user has less interest in. Such a system may section the original image into sections and decrease the resolution for the sections that belong to areas that the user is less interested in and then upload all the sections.

These sections should have smaller file size in total compared to the original image because the total sum resolution of the sections should be lower resolution than the resolution of the original image. The server may then generate an image with the same resolution of the original image by upscaling resolution of the sections that were downscaled in resolution and combining those upscaled sections with the sections that were not downscaled.

While some examples described here refer to images, the examples also apply to video. For example, frames from video may be treated as individual images that undergo a similar process as described for an image.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DESCRIPTION OF DRAWINGS

Like reference numbers and designations in the various drawings indicate like elements

DETAILED DESCRIPTION

Figure 1:
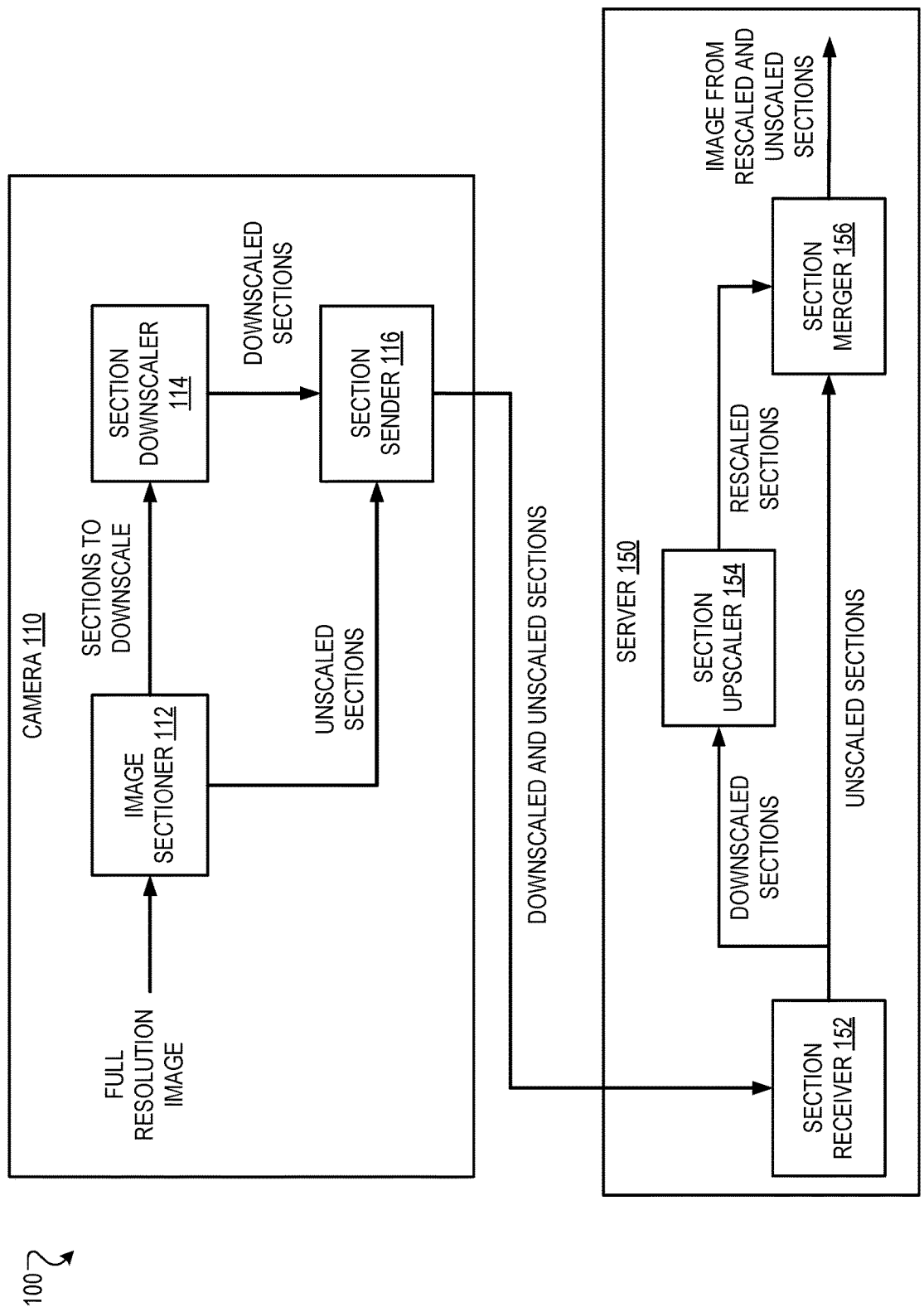
FIG. 1 illustrates a block diagram of an example system for a multi-resolution image.

FIG. 1 illustrates an example block diagram of a system 100 for a multi-resolution image. The system 100 includes a camera 110 and a server 150. The camera 110 may capture an image and then send the image to the server 150 after downscaling some sections of the image, reducing the amount of data needed for transmission.

The camera 110 includes an image sectioner 112, a section downscaler 114, and a section sender 116. The image sectioner 112 sections an image into sections to downscale and unscaled sections. For example, the image sectioner 112 may section a 1080P image view from a front door camera into a two by two grid of rectangular sections, with each section being 960×540 pixels and the two rectangular sections on the top being sections to downscale and the two rectangular sections on the bottom being sections to leave unscaled. In the example, the sections to downscale may show homes across the street so may be of less interest to a user than the unscaled sections that show a front porch and driveway of the user's home.

The image sectioner 112 may section the image based on input from a user. For example, the user may use a graphical user interface (GUI) displayed on a computing device of the user's to draw one or more sections to keep unscaled, the image sectioner 112 may receive indications of the one or more sections to keep unscaled, and the image sectioner 112 may then determine to downscale the sections that are not indicated. Alternatively, the user may use the GUI to draw one or more sections to downscale, the image sectioner 112 may receive indications of the one or more sections to downscale, and the image sectioner 112 may then downscale those sections and keep the sections that were not indicated unscaled.

Additionally or alternatively, the image sectioner 112 may automatically determine which sections of an image to downscale and keep unscaled. For example, the image sectioner 112 may determine to keep portions of the image in which motion was detected within the last ten, thirty, sixty seconds, or some other predetermined amount of time, unscaled and downscale other portions of the image.

In another example, the image sectioner 112 may determine that a door sensor has indicated that a door has opened and, in response, determine a section of the image that depicts the door to be unscaled for ten, thirty, sixty seconds, or some other predetermined amount of time, or until the door sensor indicates that the door has closed. In yet another example, the image sectioner 112 may automatically determine using object recognition that a portion of the image has an object of interest, e.g., a human, and, in response, determine to keep that portion of the image unscaled while the object of interest is being shown in that portion.

The section downscaler 114 may obtain the sections to downscale from the image sectioner 112 and then downscale the sections. For example, the section downscaler 114 may downscale a 960×540 pixel rectangular section to a 480×270 pixel rectangular section. In some implementations, the section downscaler 114 may downscale the sections by taking on average of pixels that are downscaled. For example, when downscaling the 960×540 pixel rectangular section to a 480×270 pixel rectangular section, the section downscaler 114 may take 2×2 pixel squares from the 960×540 pixel rectangular section and average the values across each of the four pixels of the 2×2 pixel squares and use the averaged values for corresponding single pixels in the 480×270 pixel rectangular section.

The section sender 116 may obtain the unscaled sections from the image sectioner 112 and the downscaled sections from the section downscaler 114, and transmit the sections to the server 150. For example, the section sender 116 may obtain the two lower 960×540 pixel rectangular sections from the image sectioner 112 and the two upper 480×270 pixel rectangular sections from the section downscaler 114, and transmit those sections to the server 150.

The section sender 116 may include metadata with the sections that indicates the resolution of the original image, the number of sections, the coordinates in the original image for each section, and each section's original resolution. For example, the section sender 116 may include metadata that indicates that the resolution of the original image was 1080P, there are four sections, that each section had an original resolution of 960×540 pixels, that a first section downscaled to 480×270 pixels has an upper left corner at the 0,0 coordinates of the original image, that a second section downscaled to 480×270 pixels has an upper left corner at the 960,0 coordinates of the original image, that a third section unscaled has an upper left corner at the 0,960 coordinates of the original image, and a fourth section unscaled has an upper left corner at the 960,960 coordinates of the original image.

The server 150 includes a section receiver 152, a section upscaler 154, and a section merger 156. The section receiver 152 may receive the sections from the camera 110. For example, the section receiver 152 may receive, from the section sender 116, the two lower 960×540 pixel rectangular sections from the image sectioner 112 and the two upper 480×270 pixel rectangular sections from the section downscaler, along with metadata that indicates that the resolution of the original image was 1080P, there are four sections, that each pixel had an original resolution of 960×540 pixels, that a first section downscaled to 480×270 pixels has an upper left corner at the 0,0 coordinates of the original image, that a second section downscaled to 480×270 pixels has an upper left corner at the 960,0 coordinates of the original image, that a third section unscaled has an upper left corner at the 0,960 coordinates of the original image, and a fourth section unscaled has an upper left corner at the 960,960 coordinates of the original image.

The section upscaler 154 may receive the downscaled sections from the section receiver 152 and upscale the sections to the original resolution for the sections. For example, the section upscaler 154 may receive the upper left 480×270 pixel rectangular section and upscale the section to a 960×540 pixel rectangular section. The section upscaler 154 may upscale sections based on the original resolution for that section specified by the metadata received from the camera 110.

For example, the section upscaler 154 may determine that metadata specifies that the upper left 480×270 pixel rectangular section had an original resolution of 960×540 pixels and, in response, upscale the section may taking the value of each pixel in the 480×270 pixel rectangular section and using that value for each value in pixels of a 2×2 pixel square in the 960×540 pixel rectangular section. A downscaled section that has been upscaled to its original resolution may be referred to as a rescaled section.

The section merger 156 may receive the rescaled sections and the unscaled sections to generate an image. For example, the section merger 156 may receive the rescaled upper left and right rectangular sections from the section upscaler 154 and the unscaled sections from the section receiver 152, and combine the sections to generate a 1080P image.

The section merger 156 may merge the sections based on the coordinates of each section indicated by the metadata received from the camera 110. For example, the section merger 156 may receive the metadata that specifies that a first section downscaled to 480×270 pixels has an upper left corner at the 0,0 coordinates of the original image, that a second section downscaled to 480×270 pixels has an upper left corner at the 960,0 coordinates of the original image, that a third section unscaled has an upper left corner at the 0,960 coordinates of the original image, and a fourth section unscaled has an upper left corner at the 960,960 coordinates of the original image, and then generate a 1080P image placing the first section in the upper left, the second section in the upper right, the third section in the lower left, and the fourth section in the lower right.

While the system 100 shows the camera including the image sectioner 112, section downscaler 114, and section sender 116, a system for a multi-resolution image may instead have the image sectioner 112, section downscaler 114, and/or section sender 116 included in a monitor control unit in a property instead of the camera 110. For example, the monitor control unit may be coupled to sensors, e.g., door open sensors, window open sensors, etc., and the camera 110 may transmit the full resolution image to the monitor control unit through a wired connection or a wireless connection. In the example, the monitor control unit may then instead similarly section the image, downscale the relevant sections, and send the sections to the server 150.

While FIG. 1 shows the system 100 transmitting a single image, FIG. 1 similarly applies to video. For example, the system 100 may process each frame of video as the system 100 processes the single image shown transmitted. The system 100 may section the video into multiple sections and downscale some of the sections similarly to how the system 100 may section an image into multiple sections and downscale some of the sections. Additionally or alternatively, the image transmitted by the system 100 may be a differential image. For example, the image may represent a difference between a captured image and a previous captured image.

Additionally or alternatively, in some implementations, the image sectioner 112 may provide the full resolution to the section downscaler 114 and unscaled sections to the section sender 116, the section downscaler 114 may downscale the entire full resolution image and provide the downscaled entire image to the section sender 116, and the section sender 116 may then send the downscaled entire image and the unscaled sections to the server 150 along with metadata that indicates a resolution of the original image, the number of unscaled sections, and the coordinates of the unscaled sections. The section upscaler 154 may then upscale the entire downscaled image, and generate an image by using the values of pixels from the unscaled sections and the values from the pixels for the remaining portions of the image from the rescaled image.

Figure 2:
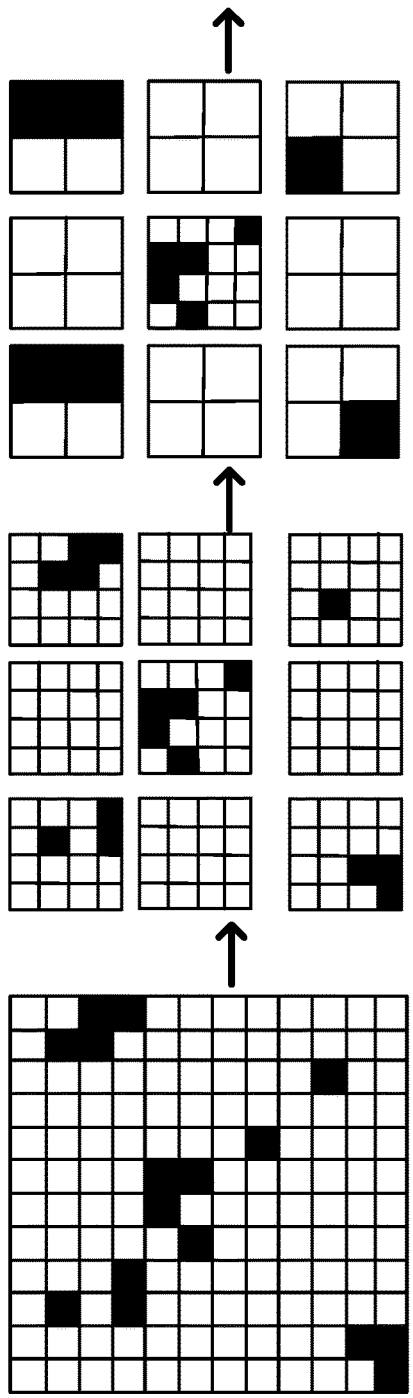
FIG. 2 illustrates an example of downscaled and unscaled sections being generated from an image.

FIG. 2 illustrates an example of downscaled and unscaled sections being generated from an image. In the example, an image may be captured at an original resolution of 12×12 pixels and sectioned into nine 4×4 pixel sections. Each the 4×4 pixel sections except for the middle section, which remains unscaled, may then be downscaled into 2×2 pixel sections. The middle unscaled section and eight outer downscaled sections are then transmitted from a camera to a server.

Figure 3:
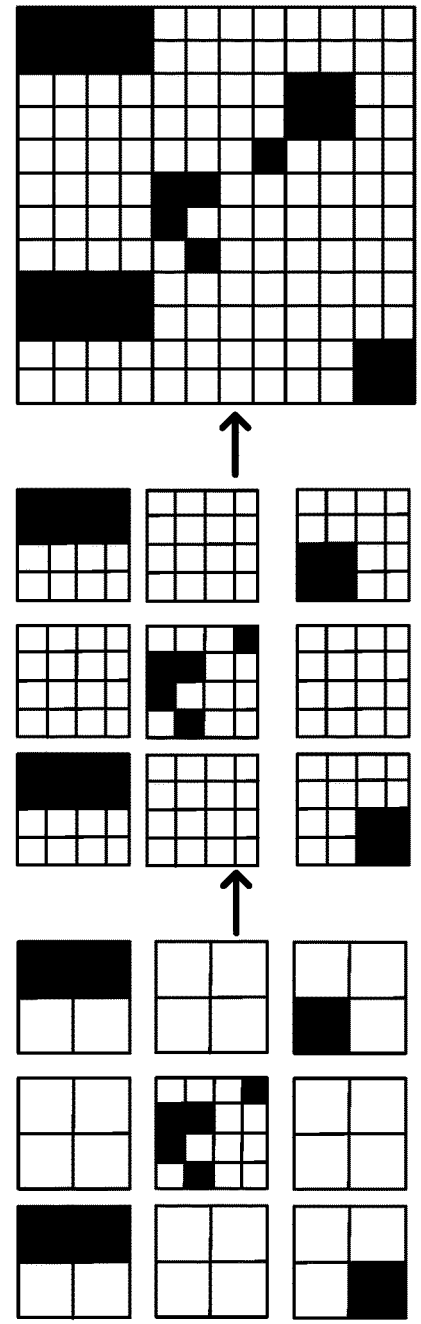
FIG. 3 illustrates an example of an image being formed from downscaled and unscaled sections.

FIG. 3 illustrates an example of an image being formed from downscaled and unscaled sections. In the example, the middle unscaled section and eight outer downscaled sections are received by a server from a camera. The eight outer 2×2 pixel downscaled sections are then upscaled to 4×4 pixel rescaled sections. The middle unscaled section and the eight outer rescaled sections are then merged to form a 12×12 pixel image.

Figure 4:
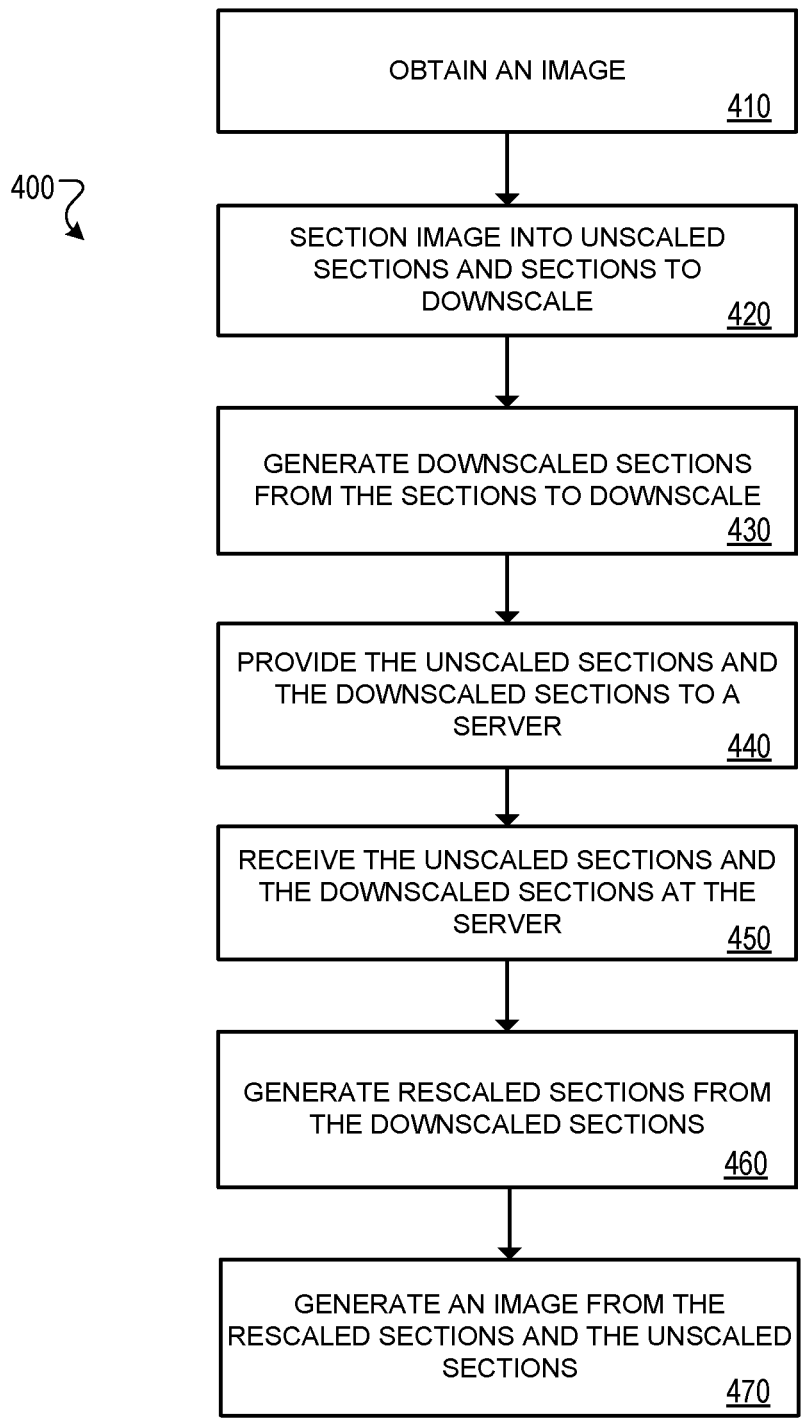
FIG. 4 is a flow diagram of an example process for generating a multi-resolution image.

FIG. 4 is a flow diagram of an example process 400 for generating a multi-resolution image. The process 400 can be implemented using system 100 described above or some other system. Thus, descriptions of process 400 may reference one or more of the above-mentioned components, modules, or computational devices of system 100. In some implementations, described actions of process 400 are enabled by computing logic or software instructions executable by a processor and memory of an example electronic device.

The process 400 includes obtaining an image (410). For example, the image sectioner 112 may receive a full resolution 4K image captured by a camera.

The process 400 includes sectioning the image into unscaled sections and sections to downscale (420). For example, the image sectioner 112 may section a 4K image into sections that form a 3×3 grid of sections, where each section has 1280×720 pixels. In some implementations, sectioning the image into unscaled sections and sections to downscale includes determining that a user has specified that a first section in the image is to be downscaled and a second section in the image is not to be downscaled. For example, the image sectioner 112 may access stored data that indicates that a user previously specified that a top half of images from a particular camera be downscaled and the bottom half of images from the particular camera not be downscaled.

In some implementations, sectioning the image into unscaled sections and sections to downscale includes detecting motion in a first section in the image and no motion in a second section in the image and, in response to detecting motion in the first section in the image and no motion in the second section in the image, determining to downscale the second section in the image and not downscale the first section in the image. For example, the image sectioner 112 may determine that a left half of an image shows motion and a right half of the image does not show motion and, in response, determine to downscale the right half of the image and not downscale the left half of the image.

In some implementations, sectioning the image into unscaled sections and sections to downscale includes detecting an object of interest in a first section in the image and no object of interest in a second section in the image and, in response to detecting the object of interest in the first section in the image and no object of interest in the second section in the image, determining to downscale the second section in the image and not downscale the first section in the image. For example, the image sectioner 112 may detect humans in a top half of an image and detect no humans in the bottom half of the image and, in response, determine to downscale the bottom half of the image and not downscale the top half of the image.

The process 400 includes generating downscaled sections from the sections to downscale (430). For example, the image sectioner 112 may determine that a user has specified to keep a middle section unscaled and downscale the remaining sections to 320×180 pixel sections and, in response, downscale the remaining sections to 320×180 pixel sections. In some implementations, generating downscaled sections from the sections to downscale includes generating a downscaled section that has a lower resolution than a corresponding section to downscale in the image. For example, the section downscaler 114 may downscale a 1280×720 pixel section into a 320×180 pixel section.

In some implementations, generating a downscaled section that has a lower resolution than a corresponding section to downscale in the image includes generating a pixel in the downscaled section based on an average of two or more pixels in the corresponding section to downscale. For example, the section downscaler 114 may generate a pixel in a downscaled section with red, green, blue values that are an average of corresponding red, green, blue values for pixels in a 2×2 pixel section of the original image.

The process 400 includes providing the unscaled sections and the downscaled sections to the server (440). For example, the section sender 116 may send the middle unscaled section and the outer downscaled sections to the section receiver 152, along with metadata that specifies the original resolution was 4K, there are nine sections, the original resolution of each section was 1280×720 pixels, and the coordinates of each of the sections in the original image.

In some implementations, providing the unscaled sections and the downscaled sections to the server includes providing the unscaled sections, the downscaled sections, and metadata that indicates how to create a reconstructed image from the unscaled sections and the downscaled sections. For example, the section sender 116 may provide two unscaled section, two downscaled sections, and metadata, where the metadata indicates that the downscaled sections are one fourth of the resolution of their corresponding sections in the original image and that the sections form a grid where a first unscaled section corresponds to an upper left, a second unscaled section corresponds to an upper right, a first downscaled section corresponds to a lower left, and a second downscaled section corresponds to a lower right.

In some implementations, the metadata indicates a resolution of the image and a location in the image that corresponds to each section. For example, the metadata may indicate that the resolution of the image was 1920×1080 pixels, and that a first section is a top half of the image and a second section is a bottom half of the image. In some implementations, the metadata indicates number of sections, coordinates in the image for each section, and an original resolution in the image for each section. For example, the metadata may indicate that the resolution of the original image was 1080P, there are four sections, that each section had an original resolution of 960×540 pixels, that a first section downscaled to 480×270 pixels has an upper left corner at the 0,0 coordinates of the original image, that a second section downscaled to 480×270 pixels has an upper left corner at the 960,0 coordinates of the original image, that a third section unscaled has an upper left corner at the 0,960 coordinates of the original image, and a fourth section unscaled has an upper left corner at the 960,960 coordinates of the original image.

The process 400 includes receiving the unscaled sections and the downscaled sections at the server (450). For example, the section receiver 152 may receive the unscaled and the downscaled sections from the section sender 116.

The process 400 includes generating the rescaled sections from the downscaled sections (460). For example, the section upscaler 154 may receive the downscaled 320×180 pixel sections and upscale the sections to 1280×720 pixel sections.

The process 400 includes generating a reconstructed image from the rescaled sections and the unscaled sections (470). For example, the section merger 156 may merge the rescaled sections and the unscaled sections to form a 4K image.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed Application-Specific Integrated Circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   obtaining an image;
   sectioning the image into unscaled sections of the image and sections of the image to downscale, wherein sectioning the image into unscaled sections of the image and sections of the image to downscale includes:
   sectioning the image into uniformly shaped sections with same dimensions;
   determining that a first portion of the uniformly shaped sections are the unscaled sections of the image; and
   determining that a second portion of the uniformly shaped sections are the sections of the image to downscale;
   generating downscaled sections from the sections of the image to downscale, wherein the downscaled sections have a lower resolution than the unscaled sections of the image;
   generating metadata that indicates how to create a reconstructed image from both the unscaled sections of the image and the downscaled sections from the sections of the image to downscale; and
   providing the unscaled sections of the image, the downscaled sections instead of the sections of the image to downscale, and the metadata to a server.

2. The method of claim 1, wherein the metadata indicates a resolution of the image and a location in the image that corresponds to each section.

3. The method of claim 2, wherein the metadata indicates number of sections, coordinates in the image for each section, and an original resolution in the image for each section.

4. The method of claim 1, wherein generating downscaled sections from the sections of the image to downscale comprises:
   generating a downscaled section that has a lower resolution than a corresponding section of the image to downscale in the image.

5. The method of claim 4, wherein generating a downscaled section that has a lower resolution than a corresponding section of the image to downscale in the image comprises:
   generating a pixel in the downscaled section based on an average of two or more pixels in the corresponding section of the image to downscale.

6. The method of claim 1, wherein sectioning the image into unscaled sections of the image and sections of the image to downscale comprises:
   determining that a user has specified that a first section in the image is to be downscaled and a second section in the image is not to be downscaled.

7. The method of claim 1, wherein sectioning the image into unscaled sections of the image and sections of the image to downscale comprises:
   detecting motion in a first section in the image and no motion in a second section in the image; and
   in response to detecting motion in the first section in the image and no motion in the second section in the image, determining to downscale the second section in the image and not downscale the first section in the image.

8. The method of claim 1, wherein sectioning the image into unscaled sections of the image and sections of the image to downscale comprises:
   detecting an object of interest in a first section in the image and no object of interest in a second section in the image; and
   in response to detecting the object of interest in the first section in the image and no object of interest in the second section in the image, determining to downscale the second section in the image and not downscale the first section in the image.

9. The method of claim 1, wherein the server is configured to perform operations of:
- receiving the unscaled sections of the image and the downscaled sections at the server;
- generating rescaled sections from the downscaled sections; and
- generating a reconstructed image from the rescaled sections and the unscaled sections of the image.

10. The method of claim 1, wherein sectioning the image into uniformly shaped sections comprises:
- sectioning the image into a N by N grid of sections.

11. The method of claim 1, wherein sectioning the image into unscaled sections of the image and sections of the image to downscale comprises:
- providing a graphical user interface that displays the image;
- receiving user input that specifies the sections of the image to downscale; and
- determining that remaining sections of the image that were not specified by the user input are the unscaled sections.

12. The method of claim 1, wherein sectioning the image into unscaled sections and sections to downscale comprises:
- in response to detecting motion in a first section in the image and no motion in a second section in the image, determining to downscale the second section in the image and not downscale the first section in further captured images for a predefined period of time.

13. The method of claim 1, wherein sectioning the image into unscaled sections and sections to downscale comprises:
- in response to determining that a door sensor has indicated that a door has opened, determining to stop downscaling a section of the image that shows the door for at least one of a predefined period of time or until the door sensor indicates that the door has closed.

14. A system comprising:
- one or more computers and one or more storage devices storing instructions that are operable, when executed by the one or more computers, to cause the one or more computers to perform operations comprising:
- obtaining an image;
- sectioning the image into unscaled sections of the image and sections of the image to downscale, wherein sectioning the image into unscaled sections of the image and sections of the image to downscale includes:
- sectioning the image into uniformly shaped sections with same dimensions;
- determining that a first portion of the uniformly shaped sections are the unscaled sections of the image; and
- determining that a second portion of the uniformly shaped sections are the sections of the image to downscale;
- generating downscaled sections from the sections of the image to downscale, wherein the downscaled sections have a lower resolution than the unscaled sections of the image;
- generating metadata that indicates how to create a reconstructed image from both the unscaled sections of the image and the downscaled sections from the sections of the image to downscale; and
- providing the unscaled sections of the image, the downscaled sections instead of the sections of the image to downscale, and the metadata to a server.

15. The system of claim 14, wherein the metadata indicates a resolution of the image and a location in the image that corresponds to each section.

16. The system of claim 15, wherein the metadata indicates number of sections, coordinates in the image for each section, and an original resolution in the image for each section.

17. The system of claim 14, wherein generating downscaled sections from the sections of the image to downscale comprises:
- generating a downscaled section that has a lower resolution than a corresponding section of the image to downscale in the image.

18. The system of claim 17, wherein generating a downscaled section that has a lower resolution than a corresponding section of the image to downscale in the image comprises:
- generating a pixel in the downscaled section based on an average of two or more pixels in the corresponding section of the image to downscale.

19. The system of claim 14, wherein sectioning the image into unsealed sections of the image and sections of the image to downscale comprises:
- determining that a user has specified that a first section in the image is to be downscaled and a second section in the image is not to be downscaled.

20. The system of claim 14, wherein sectioning the image into unsealed sections of the image and sections of the image to downscale comprises:
- detecting motion in a first section in the image and no motion in a second section in the image; and
- in response to detecting motion in the first section in the image and no motion in the second section in the image, determining to downscale the second section in the image and not downscale the first section in the image.

21. The system of claim 14, wherein sectioning the image into unscaled sections of the image and sections of the image to downscale comprises:
- detecting an object of interest in a first section in the image and no object of interest in a second section in the image; and
- in response to detecting the object of interest in the first section in the image and no object of interest in the second section in the image, determining to downscale the second section in the image and not downscale the first section in the image.

22. A non-transitory computer-readable medium storing software comprising instructions executable by one or more computers which, upon such execution, cause the one or more computers to perform operations comprising:
- obtaining an image;
- sectioning the image into unscaled sections of the image and sections of the image to downscale, wherein sectioning the image into unscaled sections of the image and sections of the image to downscale includes:
- sectioning the image into uniformly shaped sections with same dimensions:
- determining that a first portion of the uniformly shaped sections are the unscaled sections of the image; and
- determining that a second portion of the uniformly shaped sections are the sections of the image to downscale;
- generating downscaled sections from the sections of the image to downscale, wherein the downscaled sections have a lower resolution than the unscaled sections of the image;
- generating metadata that indicates how to create a reconstructed image from both the unscaled sections of the image and the downscaled sections from the sections of the image to downscale; and providing the unscaled sections of the image, the downscaled sections instead of the sections of the image to downscale, and the metadata to a server.

\* \* \* \* \*

UNITED STATES PATENT AND TRADEMARK OFFICE
CERTIFICATE OF CORRECTION

PATENT NO. : 11,288,773 B1
APPLICATION NO. : 16/847148
DATED : March 29, 2022
INVENTOR(S) : Yang Yang Zheng It is certified that error appears in the above-identified patent and that said Letters Patent is hereby corrected as shown below:

In the Claims

In Claim 19, Column 10, Line 19, delete "unsealed" and insert -- unscaled --.

In Claim 20, Column 10, Line 25, delete "unsealed" and insert -- unscaled --.

In Claim 22, Column 10, Line 55, delete "dimensions:" and insert -- dimensions; --.

Signed and Sealed this
Twenty-first Day of June, 2022

Katherine Kelly Vidal
*Director of the United States Patent and Trademark Office*